United States Patent
Pishvaibazargani et al.

(10) Patent No.: US 12,554,152 B1
(45) Date of Patent: Feb. 17, 2026

(54) SILICON-GERMANIUM BASED ELECTRO-REFRACTIVE OPTICAL MODULATOR FOR SILICON PHOTONICS

(71) Applicant: MARVELL ASIA PTE LTD, Singapore (SG)

(72) Inventors: Hamed Pishvaibazargani, Stittsville (CA); Jie Lin, Cupertino, CA (US); Masaki Kato, Palo Alto, CA (US)

(73) Assignee: MARVELL ASIA PTE LTD, Singapore (SG)

(*) Notice: Subject to any disclaimer, the term of this patent is extended or adjusted under 35 U.S.C. 154(b) by 299 days.

(21) Appl. No.: 18/188,890

(22) Filed: Mar. 23, 2023

Related U.S. Application Data

(60) Provisional application No. 63/323,155, filed on Mar. 24, 2022.

(51) Int. Cl.
G02F 1/015 (2006.01)
G02F 1/025 (2006.01)

(52) U.S. Cl.
CPC ............ G02F 1/0153 (2021.01); G02F 1/025 (2013.01)

(58) Field of Classification Search
CPC .............................. G02F 1/0153; G02F 1/025
See application file for complete search history.

(56) References Cited

U.S. PATENT DOCUMENTS

| | | | |
|---|---|---|---|
| 2018/0373067 A1* | 12/2018 | Fujikata | G02F 1/025 |
| 2019/0018262 A1* | 1/2019 | Nejadmalayeri | G02F 1/01 |
| 2019/0285916 A1* | 9/2019 | Fujikata | G02F 1/025 |
| 2023/0152662 A1* | 5/2023 | Doerr | G02B 6/122 |
| | | | 385/2 |

OTHER PUBLICATIONS

David Patel, "Design, Analysis, and Performance of a Silicon Photonic Traveling Wave Mach-Zehnder Modulator", A thesis submitted to McGill Univertisy for the degree of Master of Engineering; Department of Electrical & Computer Engineering, McGill University, Montreal, Canada, Dec. 2014.
J. Fujikata et al, High-speed Ge/Si electro-absorption optical modulator in C-band operation wavelengths, *Opt. Express*. vol. 28, No. 22, 2020.
J. Liu, "GeSi photodetectors and electro-absorption modulators for Si electronic-photonic integrated circuits," Ph.D. thesis, Massachusetts Institute of Technology (2007).
K. Prosyk et al, Tunable InP-based Optical IQ Modulator for 160 GB/s., *ECOC 2011* (*Invited*).
P. O. Weigel et al, Bonded thin film lithium niobite modulator on a silicon photonics platform exceeding 100GHz 3-dB electrical modulation bandwidth, *Opt. Express*. vol. 26, No. 18, 2018.

(Continued)

*Primary Examiner* — Thomas A Hollweg

(57) ABSTRACT

An optical modulator includes a slab of silicon, a first layer of silicon disposed on the slab, and a second layer. The second layer includes a mixture of germanium and silicon. The second layer is at least partially disposed on the first layer. The second layer includes an intrinsic portion of the mixture and further includes first and second doped portions disposed on opposite sides of the intrinsic portion. The intrinsic portion and the first and second doped portions form an active region of the optical modulator.

13 Claims, 15 Drawing Sheets

(56) References Cited

OTHER PUBLICATIONS

Pedro Damas, Mathias Berciano, Guillaume Marcaud, Carlos Alonso Ramos, Delphine Marris-Morini, et al.. Comprehensive description of the electro-optic effects in strained silicon waveguides. Journal of Applied Physics, 2017, 122 (15), 10.1063/1.4985836. hal-01878844.
*PV Lighthouse: Resistivity calculator*, accessed Mar. 1, 2023. https://www.pvlighthouse.com.au/resistivity <https://www.pvlighthouse.com.au/resistivity>.
T. Baehr-Jones et al., A 25GB/s Silicon Photonics Platform, arXiv preprint arXiv:1203.0767, 2012.
Y. Xiang et al, High-speed waveguide Ge/Si avalanche photodiode with a gain-bandwidth product of 615 GHz, *Opt. Express*. vol. 9, No. 7, Jul. 2022.

\* cited by examiner

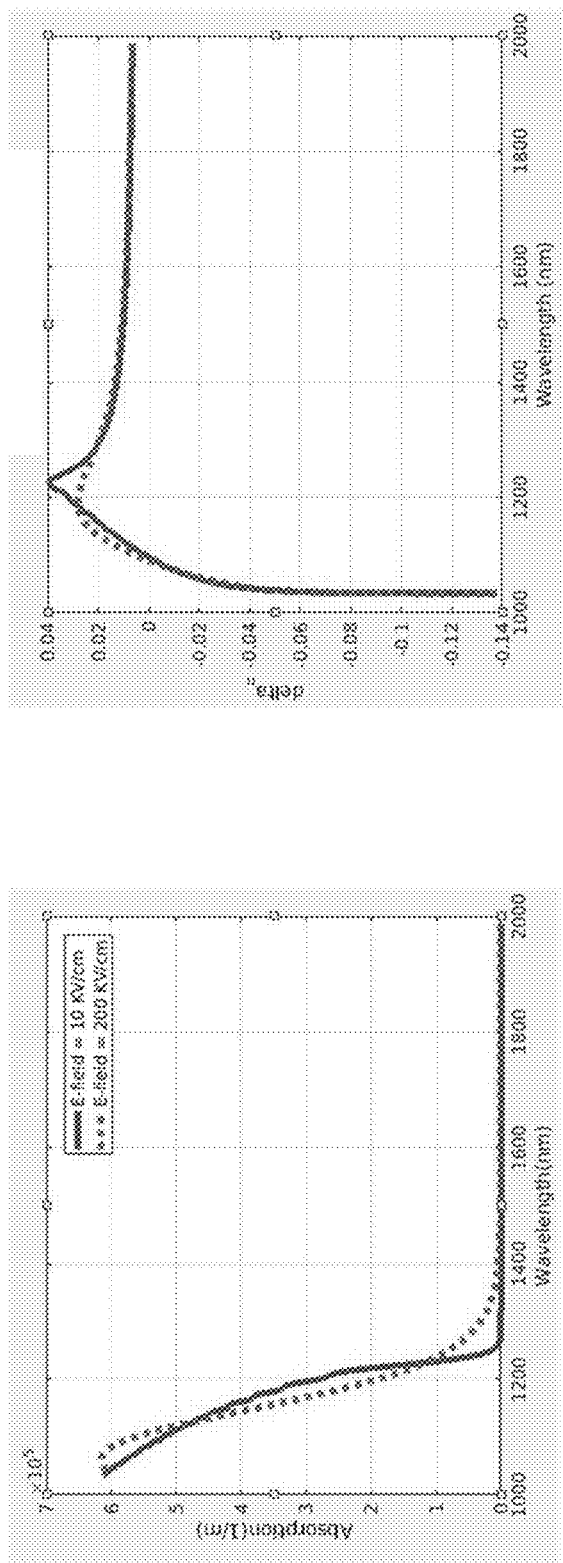
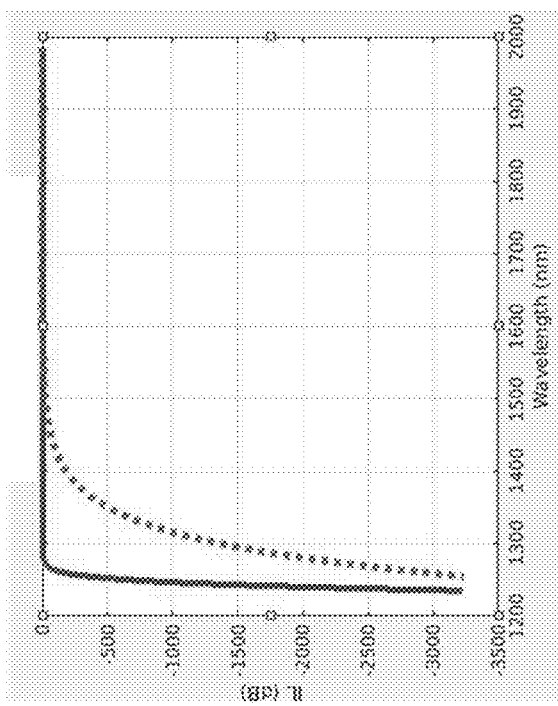
FIG. 8A
FIG. 9A
FIG. 7

SILICON-GERMANIUM BASED ELECTRO-REFRACTIVE OPTICAL MODULATOR FOR SILICON PHOTONICS

CROSS-REFERENCE TO RELATED APPLICATIONS

This application claims the benefit of U.S. Provisional Application No. 63/323,155, filed on Mar. 24, 2022. The entire disclosure of the application referenced above is incorporated herein by reference.

FIELD

The present disclosure relates generally to optical communication systems and more particularly to Si—Ge-based electro-refractive optical modulators for silicon photonics.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In optical communication systems, one of the key components in fulfilling demand for high-speed connectivity is an electro-optics (EO) modulator. EO modulators convert electrical signals into optical data streams for fast and nearly loss-less propagation through optical fibers. EO modulators are extensively used within and between data-centers. In particular, Silicon Photonics (SiPho) EO modulators are one of the best candidates for converting electrical signals to optical data streams due to their compactness and compatibility with complementary metal oxide (CMOS) manufacturing processes. Compared to other competing devices, such as indium phosphide (InP) and Lithium Niobite modulators, SiPho-based modulators are more cost effective, CMOS-compatible, and compact, which makes them good candidates for widespread use in data centers.

SUMMARY

An optical modulator comprises aa slab of silicon, a first layer of silicon disposed on the slab, and a second layer comprising a mixture of germanium and silicon. The second layer is at least partially disposed on the first layer. The second layer comprises an intrinsic portion of the mixture and further comprises first and second doped portions disposed on opposite sides of the intrinsic portion. The intrinsic portion and the first and second doped portions form an active region of the optical modulator.

In additional features, the active region is configured to absorb light of first and second wavelengths at first and second absorption levels, respectively. The first wavelengths are less than the second wavelengths. The first absorption level is greater than the second absorption level. The intrinsic portion is configured to change a refractive index of the active region to cause a 180-degree phase shift in light at the second wavelengths.

In additional features, the mixture comprises germanium and silicon in a proportion (1−x) to x, where x is a real number greater than 0 and less than 0.1.

In additional features, the active region is configured to absorb light of first and second wavelengths at first and second absorption levels, respectively. The first wavelengths are less than the second wavelengths. The first absorption level is greater than the second absorption level. The intrinsic portion is configured to change a refractive index of the active region at the second wavelengths proportionally to an amount of silicon in the mixture.

In additional features, the active region is configured to absorb light of first and second wavelengths at first and second absorption levels, respectively. The first wavelengths are less than the second wavelengths. The first absorption level is greater than the second absorption level. An amount of strain between germanium and silicon in the mixture is proportional to an amount of silicon in the mixture. The intrinsic portion is configured to change a refractive index of the active region at the second wavelengths proportionally to the amount of strain between germanium and silicon in the mixture.

In additional features, the first layer comprises a well. The intrinsic portion of the second layer extends into the well.

In additional features, the well is configured to enhance an amount of electric field coupled to the active region of the optical modulator in response to a bias applied to the optical modulator.

In additional features, the slab of silicon comprises a first intrinsic portion and at least one doped portion disposed on either side of the first intrinsic portion. The first layer of silicon comprises a second intrinsic portion and a doped portion disposed on either side of the second intrinsic portion. The second intrinsic portion at least partially overlays the first intrinsic portion. The doped portions on either side of the second intrinsic portion at least partially overlay the at least one doped portion disposed on either side of the first intrinsic portion, respectively. The intrinsic portion of the second layer at least partially overlays the second intrinsic portion of the first layer. The first and second doped portions of the second layer at least partially overlay the doped portions on either side of the second intrinsic portion of the first layer, respectively.

In additional features, the at least one doped portion disposed on either side of the first intrinsic portion of the slab of silicon are doped with dopants of first and second types, respectively. The doped portions on either side of the second intrinsic portion of the first layer are doped with the dopants of the first and second types, respectively. The first and second doped portions of the second layer are doped with the dopants of the first and second types, respectively.

In additional features, the second intrinsic portion of the first layer comprises a well. The intrinsic portion of the second layer extends into the well.

In additional features, the well is configured to enhance an amount of electric field coupled to the active region of the optical modulator in response to a bias applied to the optical modulator.

In additional features, the optical modulator further comprises first and second electrodes and a DC bias coupled to the first and second electrodes. The first and second electrodes are coupled to first and second ends of the slab, respectively, with the first electrode being grounded and the second electrode being connected to ground via a termination resistor. The DC bias is coupled to the first and second electrodes to reverse bias the active region of the optical modulator.

In additional features, the first electrode is configured to receive an RF signal comprising data to be modulated by the optical modulator with an optical carrier wave coupled to the active region through the first layer.

In additional features, the first and second electrodes comprise traveling wave electrodes disposed proximate to the active region of the optical modulator.

In still other features, an optical modulator comprises an intrinsic portion of an active region of the optical modulator, a first doped portion of the active region, and a second doped portion of the active region. The intrinsic portion comprises a mixture of germanium and silicon. The first doped portion of the active region is disposed on a first side of the intrinsic portion. The first doped portion comprises the mixture doped with a first type of dopant. The second doped portion of the active region is disposed on a second side of the intrinsic portion. The second doped portion comprises the mixture doped with a second type of dopant. The active region is configured to absorb light of first and second wavelengths at first and second levels, respectively, the first wavelengths being less than the second wavelengths, the first level being greater than the second level, the intrinsic portion changing a refractive index of the active region to cause a 180-degree phase shift in light at the second wavelengths.

In additional features, the mixture comprises germanium and silicon in a proportion (1–x) to x, where x is a real number greater than 0 and less than 0.1.

In additional features, the intrinsic portion is configured to change the refractive index of the active region at the second wavelengths proportionally to an amount of silicon in the mixture.

In additional features, an amount of strain between germanium and silicon in the mixture is proportional to an amount of silicon in the mixture. The intrinsic portion is configured to change the refractive index of the active region at the second wavelengths proportionally to the amount of strain between germanium and silicon in the mixture.

In additional features, the optical modulator further comprises a slab of silicon and a layer of silicon. The slab of silicon comprises a first intrinsic portion and at least one doped portion disposed on either side of the first intrinsic portion. The layer of silicon comprises a second intrinsic portion and a doped portion disposed on either side of the second intrinsic portion. The second intrinsic portion at least partially overlays the first intrinsic portion. The doped portions on either side of the second intrinsic portion at least partially overlay the at least one doped portion disposed on either side of the first intrinsic portion, respectively. The intrinsic portion of the active region at least partially overlays the second intrinsic portion of the layer of silicon. The first and second doped portions of the active region at least partially overlay the doped portions on either side of the second intrinsic portion of the layer of silicon, respectively.

In additional features, the first and second doped portions of the active region are doped with the dopants of the first and second types, respectively. The doped portions on either side of the second intrinsic portion of the layer of silicon are doped with the dopants of the first and second types, respectively. The at least one doped portion disposed on either side of the first intrinsic portion of the slab of silicon are doped with the dopants of the first and second types, respectively.

In additional features, the second intrinsic portion of the layer of silicon comprises a well. The intrinsic portion of the active region extends into the well.

In additional features, the well is configured to enhance an amount of electric field coupled to the active region in response to a bias applied to the optical modulator.

In additional features, the optical modulator further comprises first and second electrodes and a DC bias coupled to the first and second electrodes. The first and second electrodes are coupled to first and second ends of the slab, respectively, with the first electrode being grounded and the second electrode being connected to ground via a termination resistor. The DC bias is coupled to the first and second electrodes to reverse bias the active region of the optical modulator.

In additional features, the first electrode is configured to receive an RF signal comprising data to be modulated by the optical modulator with an optical carrier wave coupled to the active region through the layer of silicon.

In additional features, the first and second electrodes comprise traveling wave electrodes disposed proximate to the active region of the optical modulator.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIGS. 7-15 illustrate trade-offs between refractive index modulation and insertion loss for the $Si_xGe_{1-x}$ modulator of FIG. 1 for different values of x, where x is amount of silicon (Si) added to germanium (Ge), and for different values of electric field.

In the drawings, reference numbers may be reused to identify similar and/or identical elements.

DESCRIPTION

Figure 1:
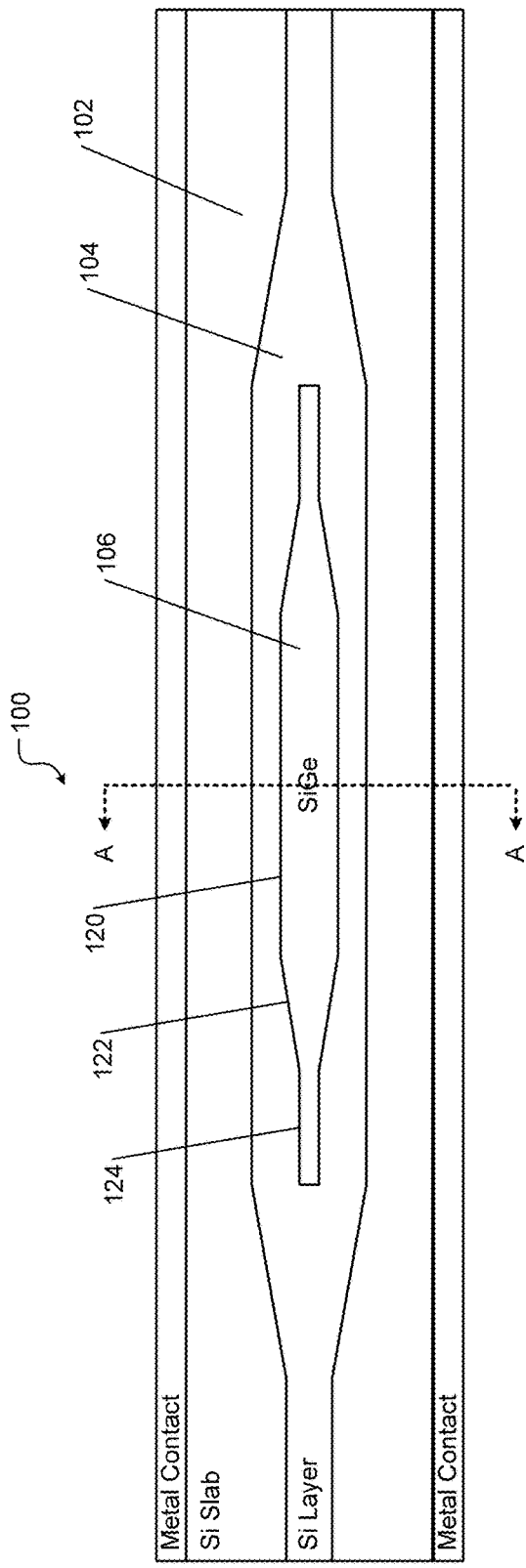
FIG. 1 shows a plan view of an example of a Si—Ge modulator according to the present disclosure.

Most SiPho-based EO modulators typically comprise an optical waveguide comprising an active region, which is typically a silicon PN junction. The SiPho-based EO modulators typically modulate light using a plasma dispersion effect. The plasma dispersion effect changes a refractive index of the active region based on injecting or removing carriers from the active region by forward or reverse biasing the active region, respectively. The carrier concentration in the active region has direct influence on the refractive index of the waveguide through the plasma-dispersion effect. The free-carrier distribution has a strong influence on the distribution of the electrostatic field inside the waveguide. Application of a voltage to the active region modifies the free-carrier density in the waveguide, which in turn changes the electrostatic field distribution in the waveguide affecting the refractive index of the waveguide. The change in refractive index imposes a phase shift on the light propagating through the optical waveguide. Injecting carriers by forward biasing the active region leads to excessive optical loss. Therefore, most conventional SiPho-based EO modulators implement carrier depletion by reverse biasing the active region.

One of the major weaknesses of conventional SiPho-based EO modulators compared to other technologies is their relative low phase efficiency. The phase efficiency of optical modulators is characterized by a figure-of-merit $V_\pi L$, where $V_\pi$ is a voltage required to achieve a phase shift of $\pi$ (180 degrees) in a modulator of length L. Better modulators are characterized with lower values of $V_\pi L$. In a SiPho-based EO modulator utilizing the plasma dispersion effect, for an optical waveguide of length 3 mm, to keep the insertion loss low and achieve a refractive index in a range of 1e-5 to 2.5e-4, a relatively high reverse bias voltage of 6.5V is needed to achieve a $\pi$ (i.e., a 180-degree) phase shift due to high level of light absorption, which yields a $V_\pi L$ of 2.05 V·cm @1550 nm. Thus, the plasma dispersion effect, which is the commonly used technique for phase modulation in SiPho-based EO modulators, is a weak effect.

The present disclosure provides a Si—Ge-based modulator that utilizes a different type of active region and a different type of light modulation in Silicon-on-Insulator (SOI) technology platform than the SiPho-based EO modulators. Specifically, the Si—Ge-based modulator of the present disclosure uses refractive index modulation at the edge or tail of the absorption band. As described below, the optical modulator of the present disclosure uses a Si—Ge based electro-refractive modulator comprising a germanium active region, where a small amount (e.g., less than 10%) of silicon is mixed with germanium. Specifically, instead of using a silicon PN junction used in SiPho-based EO modulators, the Si—Ge based electro-refractive modulator uses a PIN active region, where intrinsic (the "I" in PIN) Si—Ge material is at the center of the active region with p-doped and n-doped Si—Ge material on either side of the intrinsic Si-GE material (shown in FIGS. 1-3 and 20). The small amount of silicon mixed with germanium shifts the absorption band of the active region towards shorter wavelengths, reduces the light absorption in the C-band at the edge or tail of the absorption band, and provides a detectable modulation of the refractive index of the active region in the C-band at the edge or tail of the absorption band that causes the 180-degree phase shift at a lower bias voltage than that used in SiPho-based EO modulators.

Accordingly, the Si—Ge based electro-refractive modulator is more efficient than the silicon-based modulators using the plasma dispersion effect. Specifically, the Si—Ge based electro-refractive modulator is physically shorter in length rendering the Si—Ge based modulator more compact than the SiPho-based modulators that operate based on light absorption modulation. Further, the Si—Ge based modulator uses smaller bias voltage, has a lower $V_\pi L$, and has a higher bandwidth than the SiPho-based EO modulators while maintaining a low insertion loss. Furthermore, the modulator of the present disclosure is also CMOS-compatible. These and other features of the Si—Ge based electro-refractive modulator of the present disclosure are described below in detail.

Figure 3:
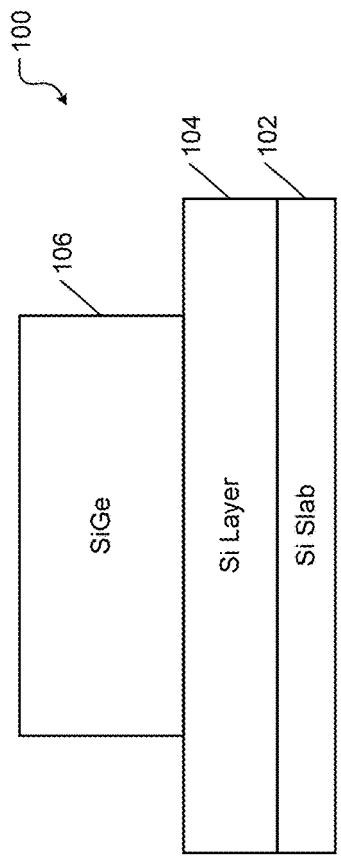
FIG. 3 shows a side view of the Si—Ge modulator of FIG. 1.
Figure 2A:
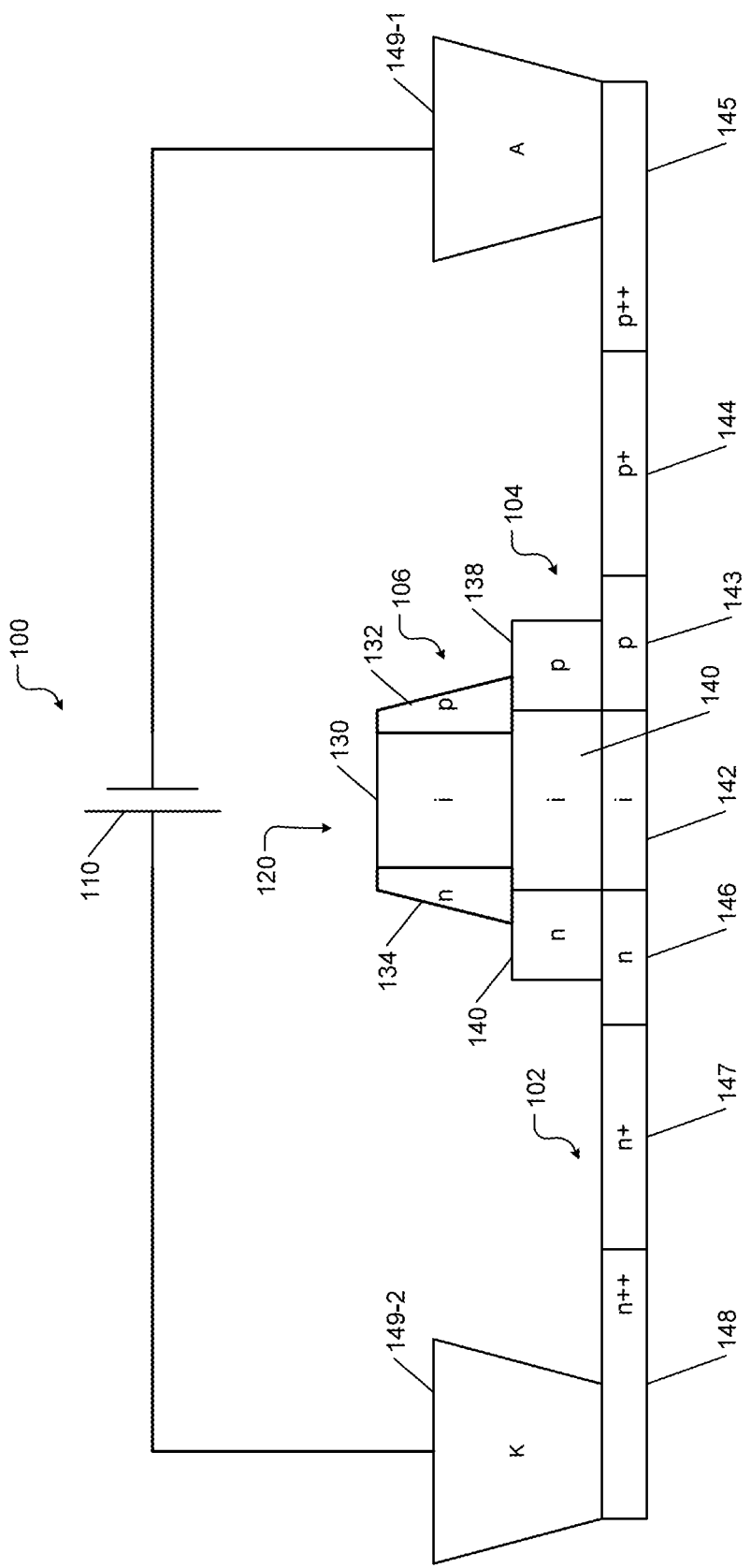
FIGS. 2A and 2B show a cross-sectional view of the Si—Ge modulator of FIG. 1 with cross-section taken along line AA shown in FIG. 1.
Figure 2B:
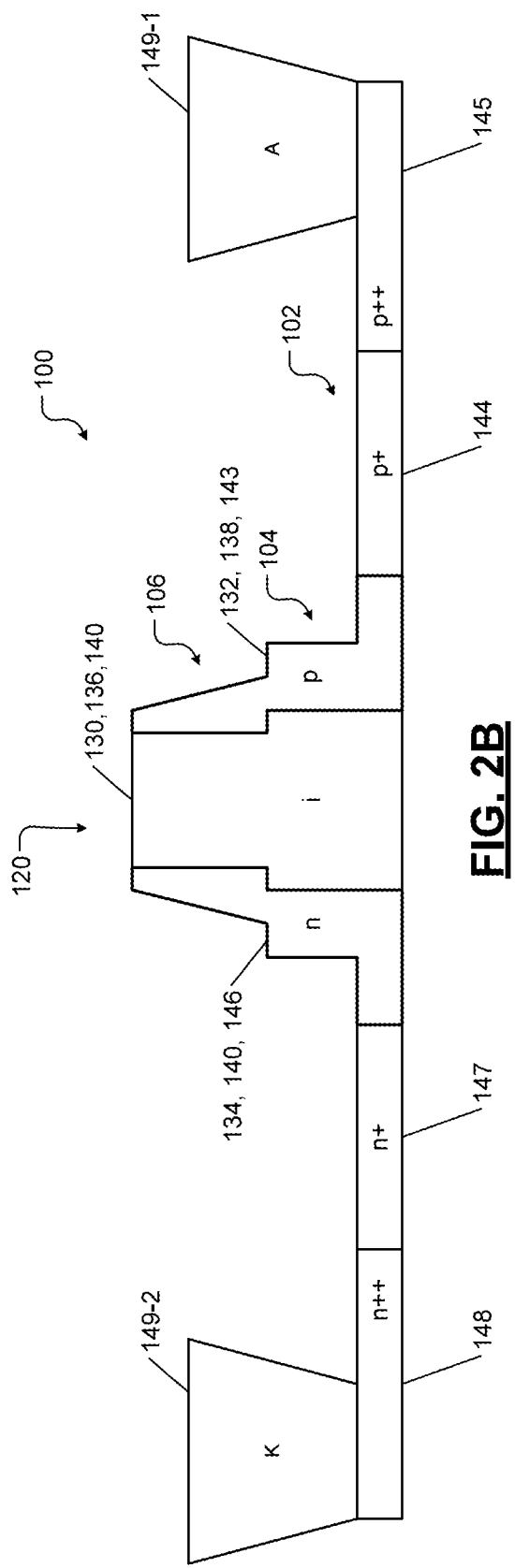
Figure 5A:
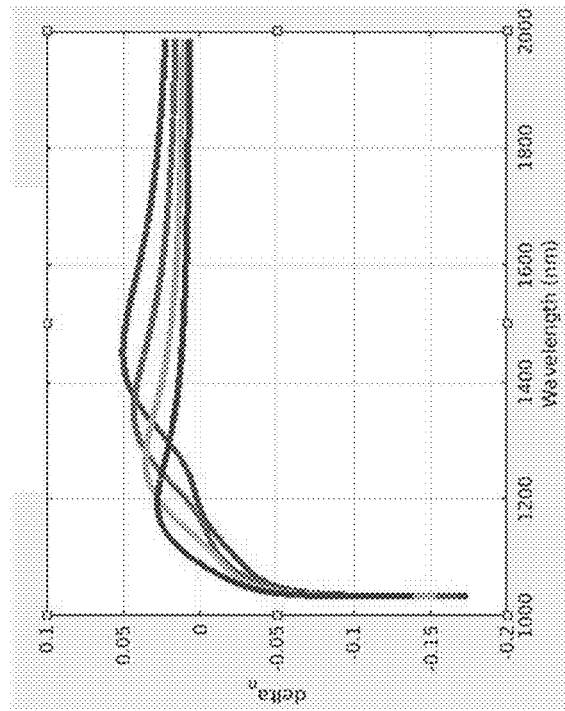
FIGS. 4-6B show examples of absorption response, refractive index modulation, and insertion loss for the $Si_xGe_{1-x}$ modulator of FIG. 1 for different values of x, where x is amount of silicon (Si) added to germanium (Ge).

FIGS. 1-3 show various views of a non-limiting example of a Si—Ge-based electro-refractive modulator (hereinafter the Si—Ge modulator) 100 according to the present disclosure. FIG. 1 shows a plan view of the Si—Ge modulator 100. FIGS. 2A and 2B show a cross-sectional view of the Si—Ge modulator 100 with the cross-section taken along line AA shown in FIG. 1. FIG. 3 shows a side view of the Si—Ge modulator 100.

As shown in FIGS. 1-3, the Si—Ge modulator 100 comprises a silicon slab 102. A layer of silicon (hereinafter the silicon layer) 104 is disposed on the silicon slab 102. A layer of germanium mixed with silicon as described above (hereinafter the Si—Ge layer) 106 is disposed on the silicon layer 104, in an embodiment. Metal electrodes (shown at 149-1 and 149-2) are disposed on the silicon slab 102 to form cathode and anode electrodes. In operation, a power supply 110 applies a voltage across the electrodes to reverse bias the Si—Ge modulator 100. In use, light is input into the silicon layer 104, which couples the light to the Si—Ge layer 106, which then modulates the light based on the change in the refractive index of the Si—Ge layer 106 in the C-band with minimum light absorption occurring in the C-band due to the addition of silicon in germanium.

As shown in FIG. 1, the Si—Ge layer 106 comprises a rectangular portion 120, two trapezoidal portions 122 that extend from the ends 121 and 123 of the rectangular portion 120, and two rectangular portion 124 that extend from two smaller size ends 125 and 127 of the two trapezoidal portions 122. While the Si—Ge layer 106 is described as comprising the various portions, the various portions are not separate pieces but are rather integral, and the Si—Ge layer 106 is a unitary (i.e., monolithic) piece.

The silicon layer 104 is similar in shape as the Si—Ge layer 106 except that the rectangular and trapezoidal portions of the silicon layer 104 are laterally larger in dimensions than the rectangular and trapezoidal portions of the Si—Ge layer 106 and the layout of the doped regions of the silicon layer 104 is different than the layout of the doped regions of the Si—Ge layer 106 as described below with reference to FIG. 1. Accordingly, the silicon layer 104 is wider than the Si—Ge layer 106. The silicon layer 104 is also a unitary (i.e., monolithic) piece. As seen in FIGS. 2 and 3, the silicon layer 104 is thicker (greater in height) than the silicon slab 102, and the Si—Ge layer 106 is thicker (greater in height) than the silicon layer 104. The silicon slab 102 is rectangular and wider than the silicon layer 104.

FIGS. 2A and 2B show the doping layout of various portions of the silicon slab 102, the silicon layer 104, and the Si—Ge layer 106. The Si—Ge layer 106 comprises an intrinsic portion 130 (shown as i), a p-type doped portion 132 (shown as p), and an n-type doped portion 134 (shown as n). The intrinsic portion 130 and the p-type and n-type doped portions 132, 134 of the Si—Ge layer 106 comprise Ge and x amount of Si. For example, x<10% (Ge). That is, the intrinsic portion 130 and the p-type and n-type doped portions 132, 134 of the Si—Ge layer 106 comprise $Si_xGe_{1-x}$, where x is a positive real number greater than 0 and less than 0.1. That is, 0<x<0.1, where x is a positive real number. The p-type and n-type doped portions 132, 134 of the Si—Ge layer 106 comprise $Si_xGe_{1-x}$, and additionally comprise p-type and n-type dopants. For example, the p-type and n-type dopants comprise boron and phosphorous, respectively. The rectangular portion 120 of the Si—Ge layer 106 comprises intrinsic (i.e., undoped) $Si_xGe_{1-x}$ and the remaining portions of the trapezoidal Si—Ge layer 106 on either side of the rectangular intrinsic portion of the Si—Ge layer 106, which are doped with the p-type and n-type dopants forming the p-type and n-type doped portions 132, 134 of the Si—Ge layer 106, respectively.

The silicon layer 104 also comprises an intrinsic portion 136 (shown as i), a p-type doped portion 138 (shown as p), and an n-type doped portion 140 (shown as n). The intrinsic portion 136 of the silicon layer 104 is undoped and is rectangular. The intrinsic portion 136 of the silicon layer 104 is wider and thinner (of less height) than the intrinsic portion 130 of the Si—Ge layer 106. The intrinsic portion 130 of the Si—Ge layer 106 is disposed directly above the intrinsic portion 136 of the silicon layer 104. The remaining portions 138, 140 of the silicon layer 104 on either side of the rectangular intrinsic portion 136 of the silicon layer 104 are doped with the p-type and n-type dopants forming the p-type and n-type doped portions 138, 140 of the silicon layer 104, respectively.

The silicon slab 102 also comprises an intrinsic portion 142 (shown as i); a plurality of p-type doped portions 143, 144, 145 (e.g., p, p+, p++); and a plurality of n-type doped portions 146, 147, 148 (e.g., n, n+, n++). The number of the p-type and n-type doped portions in the silicon slab 102 can be different than that shown as an example. The intrinsic portion 142 of the silicon slab 102 is undoped and is rectangular. The intrinsic portion 142 of the silicon slab 102 is of the same width as the intrinsic portion 136 of the silicon layer 104. The intrinsic portion 142 of the silicon slab 102 is thinner (of less height) than the intrinsic portion 136 of the silicon layer 104. The intrinsic portion 136 of the silicon layer 104 is disposed directly above the intrinsic portion 142 of the silicon slab 102.

The p-type doped portions 143, 144, 145 of the silicon slab 102 are disposed on a first side of the intrinsic portion 142 of the silicon slab 102. The n-type doped portions 146, 147, 148 of the silicon slab 102 are disposed on a second side of the intrinsic portion 142 of the silicon slab 102. The first side and second side of the silicon slab 102 extend in opposite directions from the intrinsic portion 142 of the silicon slab 102.

In an embodiment, the doping levels of the p-type doped portions 143, 144, 145 of the silicon slab 102 increase (e.g., p, p+, p++) as the distances of the p-type doped portions 143, 144, 145 of the silicon slab 102 increase from the intrinsic portion 142 of the silicon slab 102. The doping levels of the n-type doped portions 146, 147, 148 of the silicon slab 102 also increase (e.g., n, n+, n++) as the distances of the n-type doped portions 146, 147, 148 of the silicon slab 102 increase from the intrinsic portion 142 of the silicon slab 102.

The lengths (widths) of the p-type doped portions 143, 144, 145 of the silicon slab 102 increase as the distances of the p-type doped portions 143, 144, 145 the silicon slab 102 increase from the intrinsic portion 142 of the silicon slab 102. The lengths (widths) of the n-type doped portions 146, 147, 148 of the silicon slab 102 also increase as the distances of the n-type doped portions 146, 147, 148 of the silicon slab 102 increase from the intrinsic portion 142 of the silicon slab 102. While the silicon slab 102 is shown and described as comprising various portions, the silicon slab 102 is monolithic.

The intrinsic portion 130 and the p-type and n-type doped portions 132, 134 of the Si—Ge layer 106, the intrinsic portion 136 and the p-type and n-type doped portions 138, 140 the silicon layer 104, and the intrinsic portion 142 and the p-type and n-type doped portions 143, 146 of the silicon slab 102 form the PIN region of the Si—Ge modulator 100. Specifically, the intrinsic portion 130 of the Si—Ge layer 106, the intrinsic portion 136 of the silicon layer 104, and the intrinsic portion 142 of the silicon slab 102 are stacked as shown. The intrinsic portion 130 of the Si—Ge layer 106, the intrinsic portion 136 of the silicon layer 104, and the intrinsic portion 142 of the silicon slab 102 form the intrinsic region of the PIN region of the Si—Ge modulator 100. The p-type and n-type doped portions 132, 134 of the Si—Ge layer 106, the p-type and n-type doped portions 138, 140 of the silicon layer 104, and p-type and n-type doped portions 143, 146 of the silicon slab 102 are also stacked and form the p-type and n-type doped regions of the Si—Ge modulator 100.

The p-type and n-type doped portions 143, 146 of the silicon slab 102 and the p-type and n-type doped portions 138, 140 of the silicon layer 104 are depicted as being rectangular. The intrinsic portion 142 of the silicon slab 102 and the intrinsic portion 136 of the silicon layer 104 are depicted as being rectangular and as being of the same width but the intrinsic portion 136 of the silicon layer 104 is thicker (of greater height) than the intrinsic portion 142 of the silicon slab 102. The p-type and n-type doped portions 143, 146 of the silicon slab 102 are disposed adjacent to the intrinsic portion 142 of the silicon slab 102 on the first side and the second side of the intrinsic portion 142 of the silicon slab 102, respectively. The p-type and n-type doped portions 138, 140 of the silicon layer 104 are disposed adjacent to the intrinsic portion 136 of the silicon layer 104 on the first side and the second side of the intrinsic portion 136 of the silicon layer 104, respectively.

The p-type and n-type doped portions 143, 146 of the silicon slab 102 and the p-type and n-type doped portions 138, 140 of the silicon layer 104 are depicted as being rectangular and as being of the same thickness (height) as the intrinsic portions 142, 136 of the silicon slab 102 and the silicon layer 104, respectively, in an embodiment. The p-type and n-type doped portions 143, 146 of the silicon slab 102 are wider than the p-type and n-type doped portions 138, 140 of the silicon layer 104. The p-type and n-type doped portions 138, 140 of silicon layer 104 are disposed directly above the p-type and n-type doped portions 143, 146 of the silicon slab 102. The p-type and n-type doped portions 132, 134 of Si—Ge layer 106 are disposed directly above the p-type and n-type doped portions 138, 140 of the silicon layer 104.

The p-type and n-type doped portions 132, 134 of Si—Ge layer 106 are of the same height as the intrinsic portion 130 of the Si—Ge layer 106. Due to the trapezoidal shape of the Si—Ge layer 106, the p-type and n-type type doped portions 132, 134 of Si—Ge layer 106 taper (slope) from the top of the Si—Ge layer 106 to the bottom of the Si—Ge layer 106 such that the top ends of the p-type and n-type doped portions 132, 134 of the Si—Ge layer 106 are thinner (less wide) than the bottom ends of the p-type and n-type doped portions of the Si—Ge layer 106. That is, the thickness (width) of the p-type and n-type doped portions 132, 134 of the Si—Ge layer 106 increases from the top end to the bottom end of the Si—Ge layer 106.

Since the intrinsic portion 130 of the Si—Ge layer 106 is narrower (less wide) than the intrinsic portion 136 of the silicon layer 104, the bottom ends of the p-type and n-type doped portions 132, 134 of the Si—Ge layer 106 extend partially over outer portions of the intrinsic portion 136 of the silicon layer 104. The bottom ends of the p-type and n-type doped portions 132, 134 of the Si—Ge layer 106 also extend partially over inner portions and the p-type and n-type doped portions 138, 140 of the silicon layer 104, respectively.

Thus, the p-type doped portions of the Si—Ge layer 106, the silicon layer 104, and the silicon slab 102 form the p-type doped region of the Si—Ge modulator 100. The n-type doped portions of the Si—Ge layer 106, the silicon layer 104, and the silicon slab 102 form the n-type doped region of the Si—Ge modulator 100.

The PIN region of the Si—Ge modulator 100 comprising the intrinsic region formed by the intrinsic portions 130, 136, 142 of the Si—Ge layer 106, the silicon layer 104, and the silicon slab 102; the p-type doped region formed by the p-type doped portions 132, 138, 143 of the Si—Ge layer 106, the silicon layer 104, and the silicon slab 102; and the n-type doped region formed by the n-type doped portions 134, 140, 146 of the Si—Ge layer 106, the silicon layer 104, and the silicon slab 102 is seen more clearly in FIG. 2B. The metal electrodes 149-1, 149-2 are disposed on the p-type and n-type doped portions 145, 148 of the silicon slab 102 to form the anode and cathode electrodes 149-1, 149-2 of the Si—Ge modulator 100. In operation, the power supply 110 applies a voltage across the anode and cathode electrodes 149-1, 149-2 to reverse bias the Si—Ge modulator 100.

The Si—Ge based optical modulator 100 of the present disclosure exploits various optical and mechanical properties of germanium and silicon described below, which are engineered and optimized as follows. Germanium (Ge) and silicon (Si) are both classified as indirect bandgap semiconductors with the smallest (indirect) bandgap at 0.66 eV and 1.12 eV, respectively. A direct bandgap energy at around 0.8 eV≈1550 nm is found in Ge. In silicon, the smallest direct bandgap is found at 3.4 eV≈365 nm. Therefore, Ge exhibits a high level of photon absorption in the C-band (1530 nm-1565 nm). Consequently, using Ge for modulator design would seem to be impossible in the C-band.

However, a small dosage (addition) of Si to Ge (expressed as $Si_xGe_{1-x}$) shifts the absorption band to higher energies/lower wavelengths. The present disclosure exploits the variation in refractive index of the $Si_xGe_{1-x}$ material in the wavelength range of interest near the tail end of the shifted absorption band, where photon absorption is minimum, based on Kramers-Kronig relations. Thus, unlike other modulators that operate based on the plasma dispersion effect, the Si—Ge-based modulator of the present disclosure operates near the tail end of the absorption band and utilizes the variation in refractive index of the $Si_xGe_{1-x}$ material near the tail end of the absorption band where photon absorption is minimum. Since the light absorption in the $Si_xGe_{1-x}$ material near the tail end of the absorption band is minimum, the modulation of refractive index of the $Si_xGe_{1-x}$ material near the tail end of the absorption band in the wavelengths of interest (C-bad) is more detectable than the modulation of refractive index possible in SiPho-based modulators using the plasma dispersion effect in which light absorption in the PN active region is high at the wavelengths of interest and therefore the modulation in the refractive index of the PN active region at the wavelengths of interest is less detectable in SiPho-based modulators than in the Si—Ge-based modulator of the present disclosure.

Further, for a given length of the modulator, the amount of voltage required to generate detectable modulation in the refractive index that is sufficient cause the 180-degree phase shift in the $Si_xGe_{1-x}$ material near the tail end of the absorption band where photon absorption is minimum is less than the amount of voltage required to generate detectable modulation in the refractive index of the PN active material in the absorption band where photon absorption is high. The Si—Ge-based modulator therefore improves the $V_\pi L$ figure-of-merit compared to the conventional SiPho-based modulators that use the plasma dispersion effect.

The amount x of silicon added to germanium in the Si—Ge-based modulator can be optimized as follows. In SOI technology platform, when growing Ge on Si, the lattice constant of Ge ranges between 0.56573 nm and 0.56579 nm whereas the lattice constant Si is about 0.5431 nm. The lattice mismatch between the two materials (Ge and Si) causes strain accumulation and dislocations when germanium is deposited on silicon. The strain distorts the lattice of the semiconductor materials, which changes their band structures. However, strain can also be implemented to engineer the band gap and the carrier mobility. Engineering the bandgap modifies the absorption/emission properties of the material so that photon detection/emission of the material can be adjusted. Tensile strain reduces the bandgap, allowing the material to absorb photons at lower energy (called red shifting the absorption edge). On the other hand, compressive strain produces blueshift due to an increment of the bandgap. When Ge is selectively grown on Si, tensile strain is considerably more significant than compressive strain. The tensile strain ranges between 0.2% to 0.25%. By introducing a 0.25% tensile strain in epitaxial Ge films grown on Si, the direct bandgap of Ge can be decreased from 0.801 eV (corresponding to 1550 nm) to 0.764 eV (corresponding to 1623 nm). Varying the amount x of Si added to Ge can vary the amount of refractive index modulation as described below.

Figure 4:
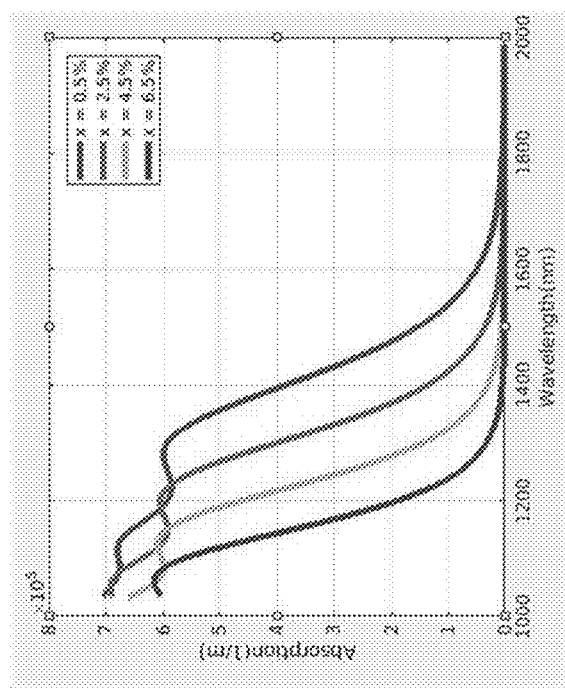
Figure 6A:
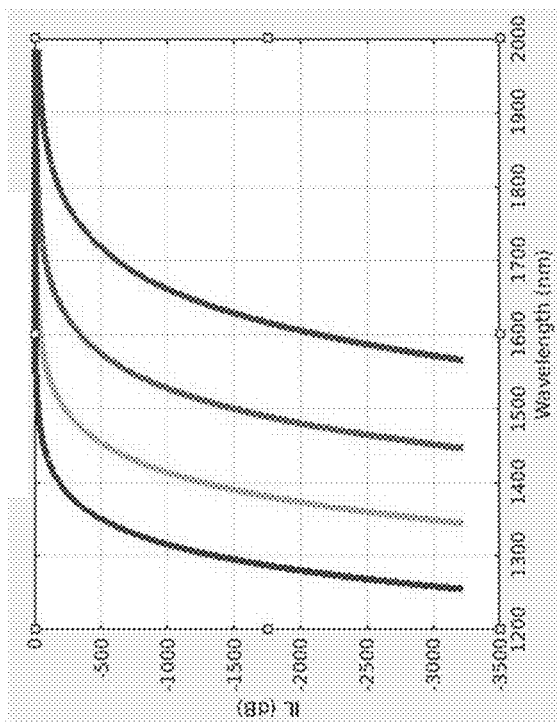
Figure 5B:
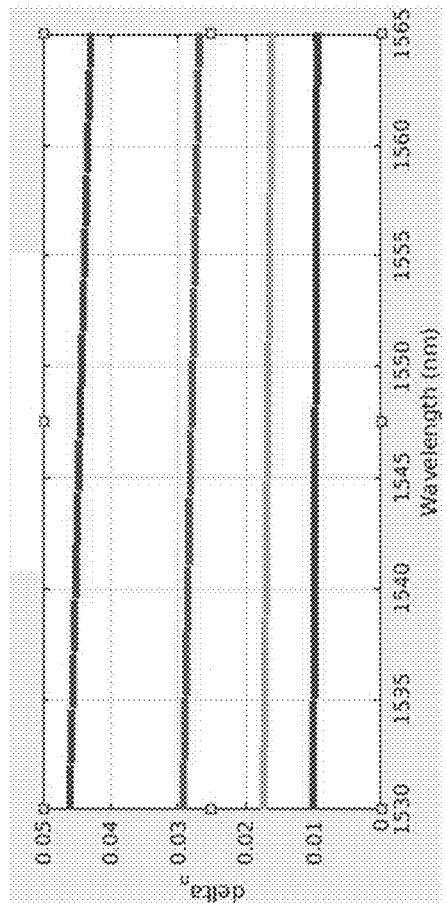
Figure 6B:
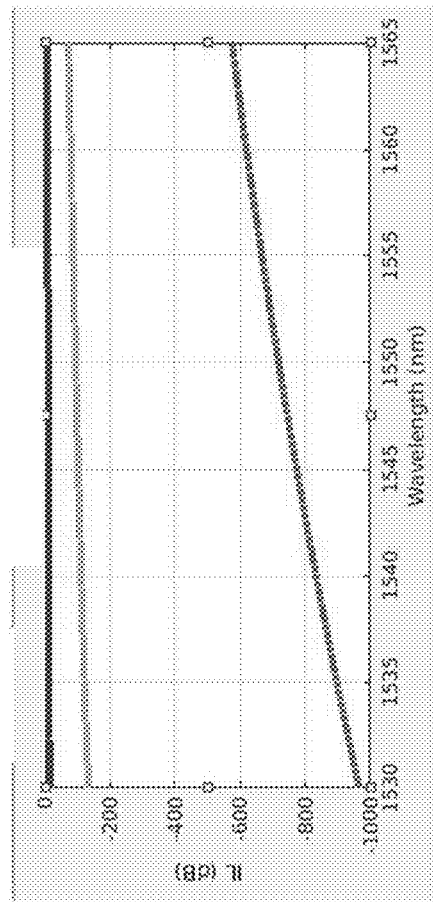
Figure 8B:
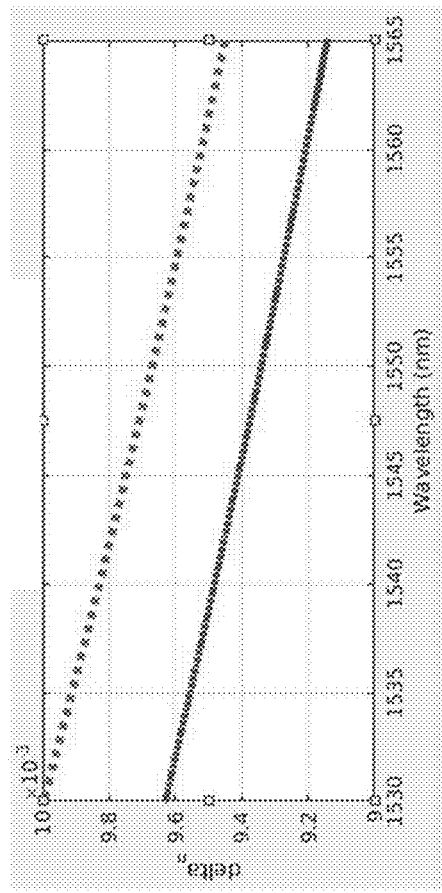

FIGS. 4-6B show examples of absorption response, refractive index modulation, and insertion loss for the $Si_xGe_{1-x}$ modulator 100 of length 1 cm for four different values of x, where x is the amount of Si added to Ge. For example, the graphs are for x being 0.5%, 2.5%, 4.5%, and 6.5% and for electric field of 200 KV/cm. A tensile strain of 0.2% is presumed. FIG. 4 shows a graph of amount of absorption versus wavelength. FIG. 5A shows a graph of refractive index versus wavelength for the $Si_xGe_{1-x}$ modulator 100. FIG. 6A shows a graph of insertion loss versus wavelength for the $Si_xGe_{1-x}$ modulator 100. FIGS. 5B and 6B respectively show expanded views of FIGS. 5A and 6A for the C-band (1530 nm-1565 nm). As seen in FIG. 4, increasing x reduces the wavelength at which absorption peaks and shifts the absorption spectra towards shorter wavelengths. Due to the shift in the absorption spectra, the absolute value of Δn drops as seen in FIGS. 5A and 5B. The insertion loss also changes correspondingly as seen in FIGS. 6A and 6B.

In the $Si_xGe_{1-x}$ modulator 100, there is a trade-off between the amount of refractive index modulation that can be achieved by adding Si to Ge versus the insertion loss that occurs due to absorption. The value of x (i.e., the amount of Si added to Ge) can be optimized to achieve similar or better insertion loss in the $Si_xGe_{1-x}$ modulator 100 compared to SiPho-based modulators that use the plasma dispersion effect, while significantly decreasing bias voltage and increasing the amount of refractive index modulation by operating the Si—Ge-based modulator near the edge or tail end of the absorption band instead of operating the Si—Ge-based modulator in the absorption band as follows.

Figure 9B:
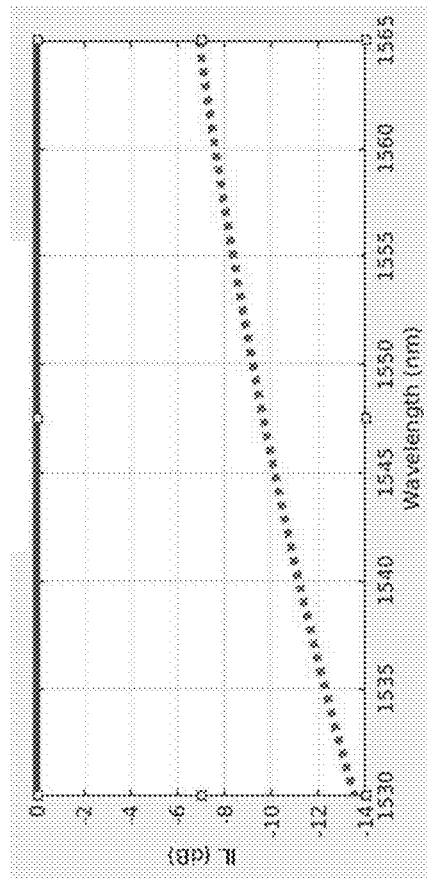
Figure 11A:
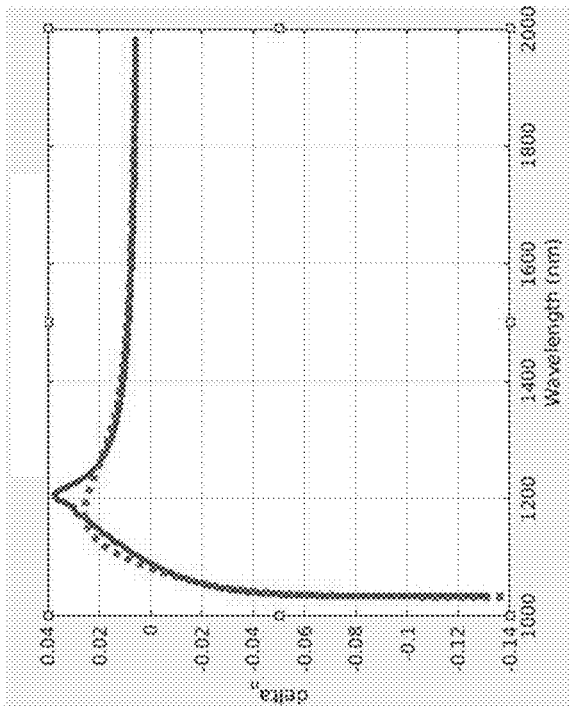
Figure 10:
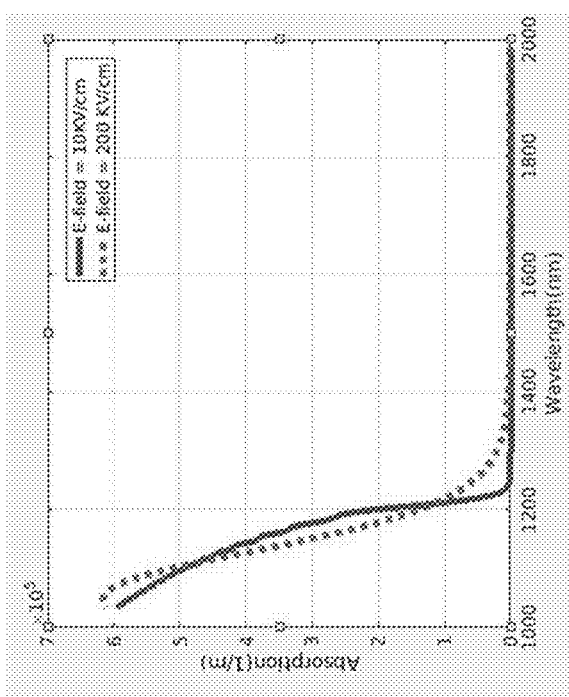
Figure 12A:
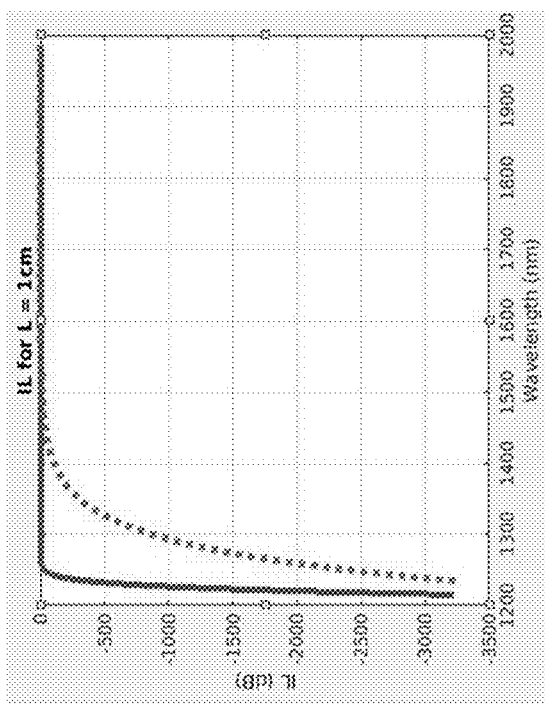
Figure 11B:
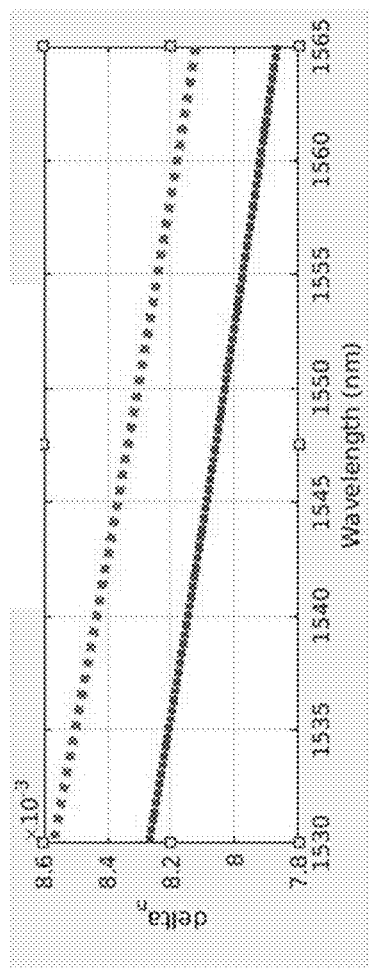
Figure 12B:
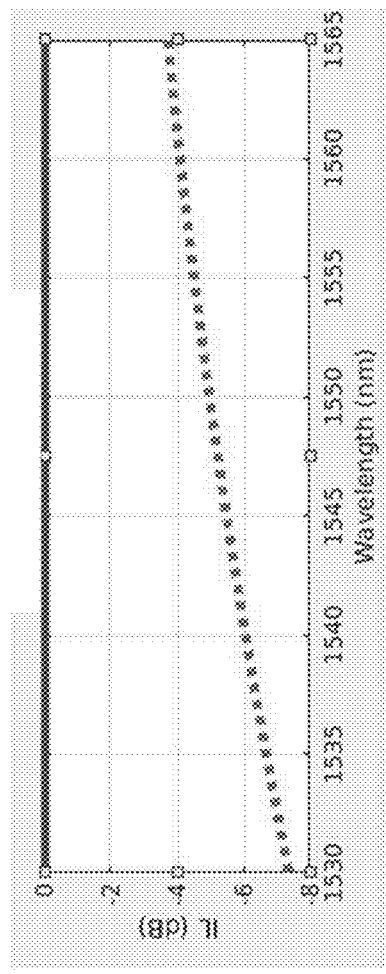

FIGS. 7-9B show examples of absorption response, refractive index modulation, and insertion loss for $Si_xGe_{1-x}$ modulator 100 of length 1 cm with x=6.5% and for two different electric fields of 10 KV/cm and 200 KV/cm. FIG. 7 shows a graph of amount of absorption versus wavelength for the $Si_xGe_{1-x}$ modulator 100. FIG. 8A shows a graph of refractive index versus wavelength for the $Si_xGe_{1-x}$ modulator 100. FIG. 9A shows a graph of insertion loss versus wavelength for the $Si_xGe_{1-x}$ modulator 100. FIGS. 8B and 9B respectively show expanded views of FIGS. 8A and 9A for the C-band (1530 nm-1565 nm).

For example, as seen in FIGS. 7-9B, for Si—Ge-based modulator 100 using $Si_{0.065}Ge_{0.935}$ (i.e., with x=6.5%), $\Delta n=3.3\times10^{-4}$@3V bias voltage (reverse bias) and IL=9 dB/cm@ 1550 nm. In comparison, for SiPho-based modulators that use the plasma dispersion effect, $\Delta n=2.5\times10^{-4}$@6.5V bias voltage (reverse bias) and IL=9 dB/cm@ 1550 nm. Thus, the Si—Ge-based modulator 100 with x=6.5% achieves a higher refractive index modulation at less than half the bias voltage with the same insertion loss compared to the SiPho-based modulators that use the plasma dispersion effect.

Alternatively, in the $Si_xGe_{1-x}$ modulator 100, the insertion loss can be improved at the cost of a small decrease in refractive index modulation by slightly increasing x (e.g., from 6.5% to 7%). For example, FIGS. 10-12B show graphs similar to FIGS. 7-9B but with x=7% instead of x=6.5%. As seen in FIGS. 10-12B, for Si—Ge-based modulator 100 using $Si_{0.07}Ge_{0.93}$ (i.e., with x=7%), $\Delta n=2.7\times10^{-4}$@3V bias voltage (reverse bias) and IL=7 dB/cm@ 1550 nm. Notably, in addition to significantly lowering the bias voltage (by half), both $\Delta n$ and IL for the Si—Ge-based modulator 100 using $Si_{0.07}Ge_{0.93}$ are better than $\Delta n=2.5\times10^{-4}$@6.5V bias voltage (reverse bias) and IL=9 dB/cm@ 1550 nm for SiPho-based modulators that use the plasma dispersion effect.

Figure 13:
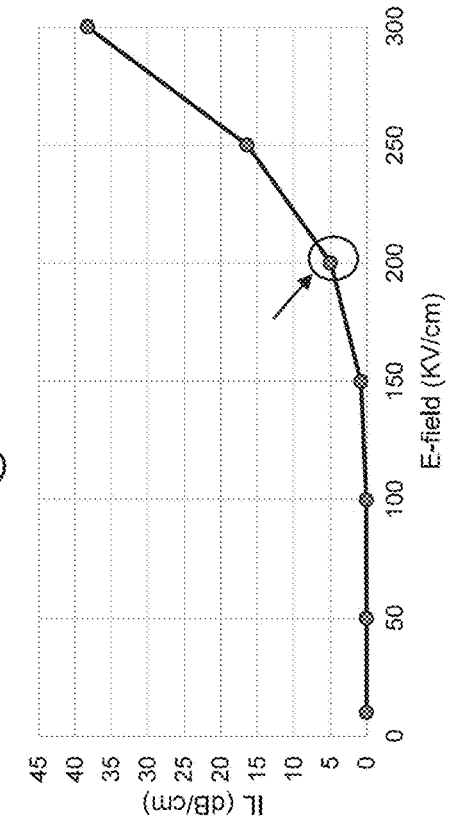
Figure 14:
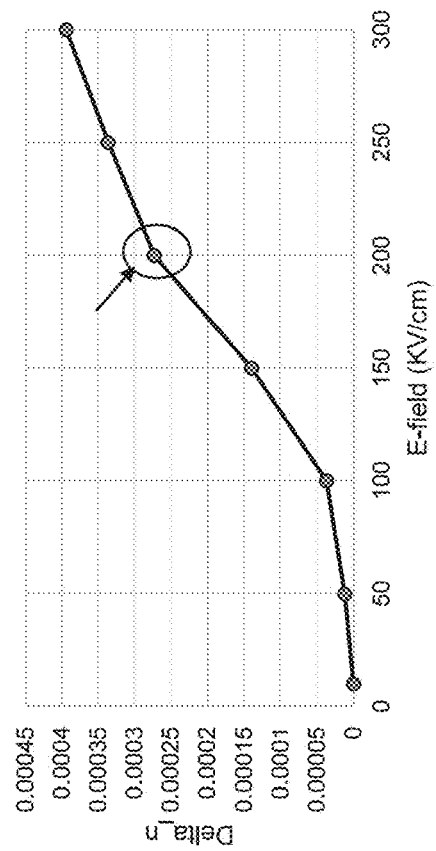
Figure 15:
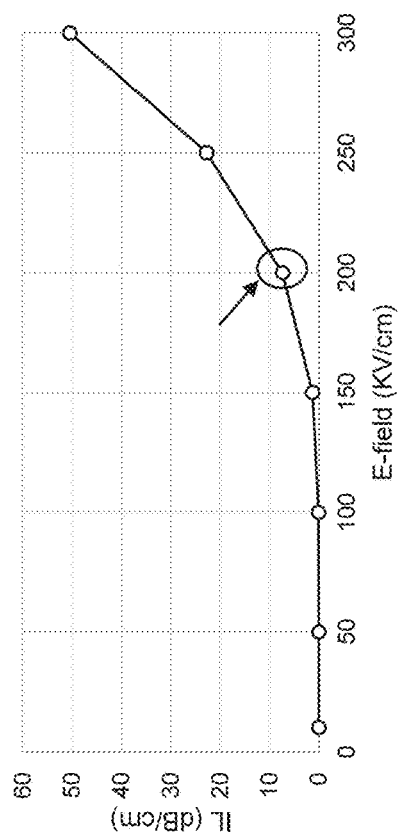

In the $Si_xGe_{1-x}$ modulator 100, the trade-off between the amount of refractive index modulation and the insertion loss can also be controlled by controlling the bias voltage for a given value of x used in the Si—Ge-based modulator 100. For example, assuming a uniform distribution of electric field and 100% overlap between the optical mode and electric field distribution in the active region of the Si—Ge-based modulator 100, FIGS. 13-15 show the variation in index modulation and optical insertion loss for different values of electric field for the Si—Ge-based modulator 100 with x=7%. For example, as seen in FIG. 13, at 200 KV/cm, $\Delta n=2.7\times10^{-4}$@1550 nm; and as seen in FIGS. 14 and 15, IL=5 dB/cm@ 1550 nm and 7 dB/cm@ 1530 nm, respectively.

Thus, the Si—Ge-based modulator 100 achieves detectable modulation of the refractive index of the $Si_xGe_{1-x}$ material to cause the 180-degree phase shift while keeping the photon absorption to a minimum by operating the Si—Ge-based modulator 100 near the edge of the absorption band so that the amount of modulation of the refractive index of the $Si_xGe_{1-x}$ material provides a 180-degree phase shift at lower bias voltages compared to the SiPho-based modulators. The amount of index modulation and insertion loss in the Si—Ge-based modulator 100 can be engineered using different amounts of silicon (i.e., different values of x) in the $Si_xGe_{1-x}$ material used in the active region as follows.

Figure 16:
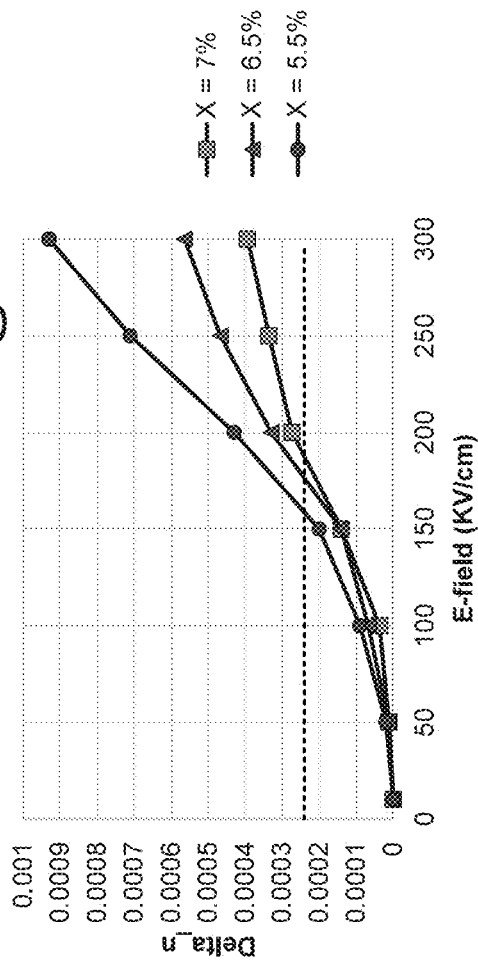
FIGS. 16-18B show graphs of refractive index and insertion loss versus electric field for the $Si_xGe_{1-x}$ modulator of FIG. 1 for the various values of x.
Figure 17:
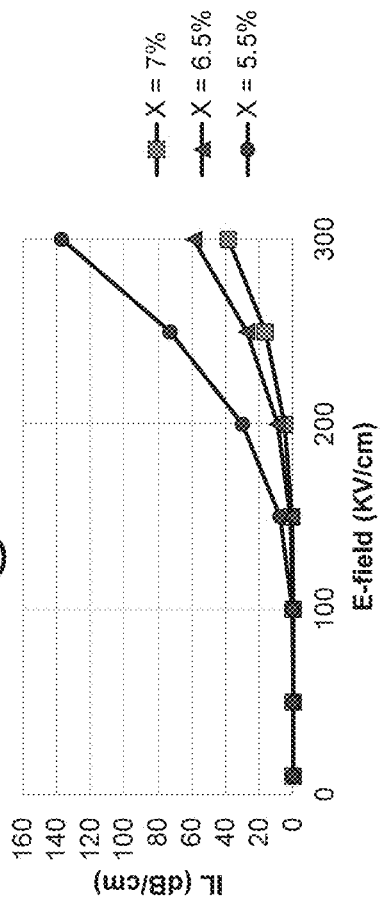
Figure 18A:
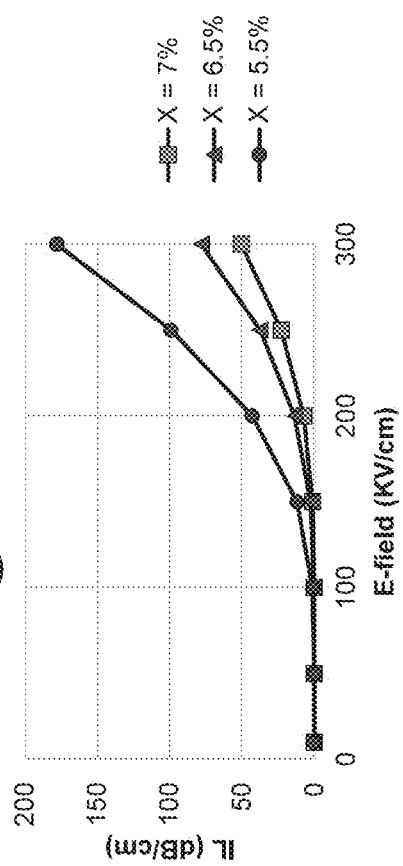
Figure 18B:
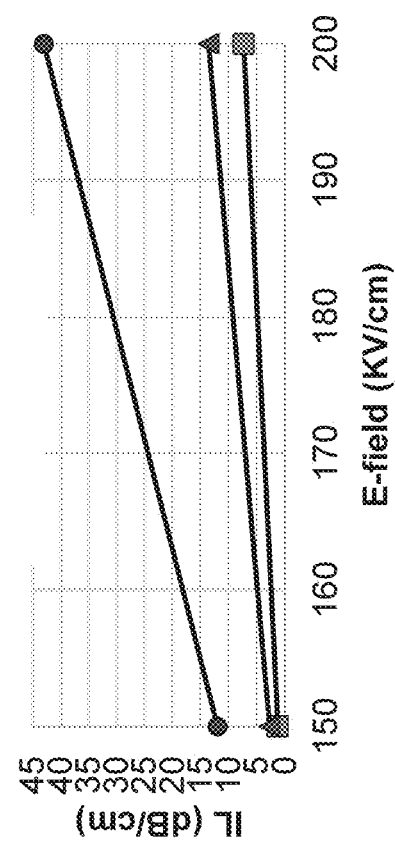

FIGS. 16-18B show the index modulation and insertion loss for various values of x for the $Si_xGe_{1-x}$ modulator 100. For example, x=5.5, 6.5, and 7. FIG. 16 shows a graph of refractive index versus electric field for the various values of x for the $Si_xGe_{1-x}$ modulator 100. FIG. 17 shows a graph of insertion loss @ 1550 nm versus electric field for the various values of x for the $Si_xGe_{1-x}$ modulator 100. FIG. 18A shows a graph of insertion loss @ 1530 nm versus electric field for the various values of x for the $Si_xGe_{1-x}$ modulator 100. FIG. 18B shows an expanded view of FIG. 18A.

As seen in FIG. 16, the variation in refractive index decreases as the value of x increases. That is, greater modulation of refractive index can be achieved with lower values of x. For comparison, the dashed line indicates an amount of refractive index modulation required to achieve a 180-degree phase shift in the conventional SiPho-based modulator that uses the plasma dispersion effect. In comparison, even with a small value of x, the Si—Ge-based modulator 100 provides greater refractive index modulation for electric fields greater than 200 KV/cm @ 1550 nm. Consequently, and more significantly, the Si—Ge-based modulator 100 can achieve the 180-degree phase shift at lower values of electric field (i.e., at lower bias voltages) than the conventional SiPho-based modulator that uses the plasma dispersion effect. As seen in FIG. 17, as a trade-off, the insertion loss increases as the value of x increases.

FIGS. 18A and 18B show the worst-case insertion loss over the C-band at 1530 nm for the various values of x for the $Si_xGe_{1-x}$ modulator 100. As seen from FIGS. 17, 18A, and 18B, for the $Si_xGe_{1-x}$ modulator 100, the insertion loss remains relatively the same over the C-band for x=5.5% and 6.5% at electric field of 200 KV/cm and is slightly more @ 1530 nm than @1550 nm for x=7% at electric field of 200 KV/cm.

Thus, the plasma dispersion effect in the conventional SiPho-based modulators requires a much higher bias voltage to change the refractive index of the active material to achieve the 180-degree phase shift than in the Si—Ge based modulator 100. In the $Si_xGe_{1-x}$ modulator 100, the addition of silicon in germanium shifts the absorption band of the Si—Ge active region to lower wavelengths. At the wavelengths of interest (C-band) at the edge of the absorption band, the amount of refractive index modulation is more detectable at lower bias voltages due to lower light absorption at the wavelengths of interest (C-band) than in the conventional SiPho-based modulators.

High speed performance of a modulator is defined by resistance and capacitance per unit length of the modulator. Resistivity of a modulator is dominated by p-type and n-type doped regions of the active region of the modulator. Implementing an intrinsic region in $Si_xGe_{1-x}$ modulator significantly reduces the resistance per unit length of the Si—Ge-based modulator 100 compared to the conventional SiPho-based modulator comprising a PN junction instead of the PIN junction used in $Si_xGe_{1-x}$ modulator. Consequently, the Si—Ge based modulator 100 exhibits lower ohmic losses than the SiPho-based modulator as explained below in detail.

Specifically, the intrinsic Si—Ge portion of the PIN region in the Si—Ge based modulator 100 does not contribute to ohmic losses of the modulator since the intrinsic Si—Ge portion is fully depleted of charges without requiring a bias voltage to cause carrier depletion. Instead, the intrinsic Si—Ge portion only defines the capacitance of the PIN region. The size of the p-type and n-type doped portions of the PIN region determines the ohmic losses of the modulator. Therefore, the intrinsic Si—Ge portion of the Si—Ge modulator 100 is designed to extend into the p-type and n-type doped portions of the PIN region, which reduces the size of the p-type and n-type doped portions of the PIN region, which in turn lowers the ohmic losses of the modulator.

Notably, while the PIN region of the Si—Ge modulator 100 already has an intrinsic portion (i.e., before or without applying reverse bias), the PN junction of the SiPho-based modulator has to be reverse biased to deplete carriers to create a depleted (i.e., a pseudo-intrinsic) region between the p-type and n-type doped portions of the PN junction. Thus, to create equal amount of capacitance between the p-type and n-type doped portions, an intrinsic region has to be created in the PN junction of the SiPho-based modulator by applying reverse bias whereas in the Si—Ge modulator 100, the PIN region already has some capacitance due to the native intrinsic Si—Ge portion of the PIN region. Therefore, targeting similar values of capacitance in the two modulators results in a narrower intrinsic region in the SiPho-based modulator comprising the PN junction than in the Si—Ge modulator 100 comprising the PIN region. The narrower intrinsic region in the PN junction leads to wider p-type and n-type doped regions in the SiPho-based modulator than the p-type and n-type doped regions of the Si—Ge modulator 100. Consequently, the SiPho-based modulator exhibits higher ohmic losses than the Si—Ge modulator 100.

Figure 19:
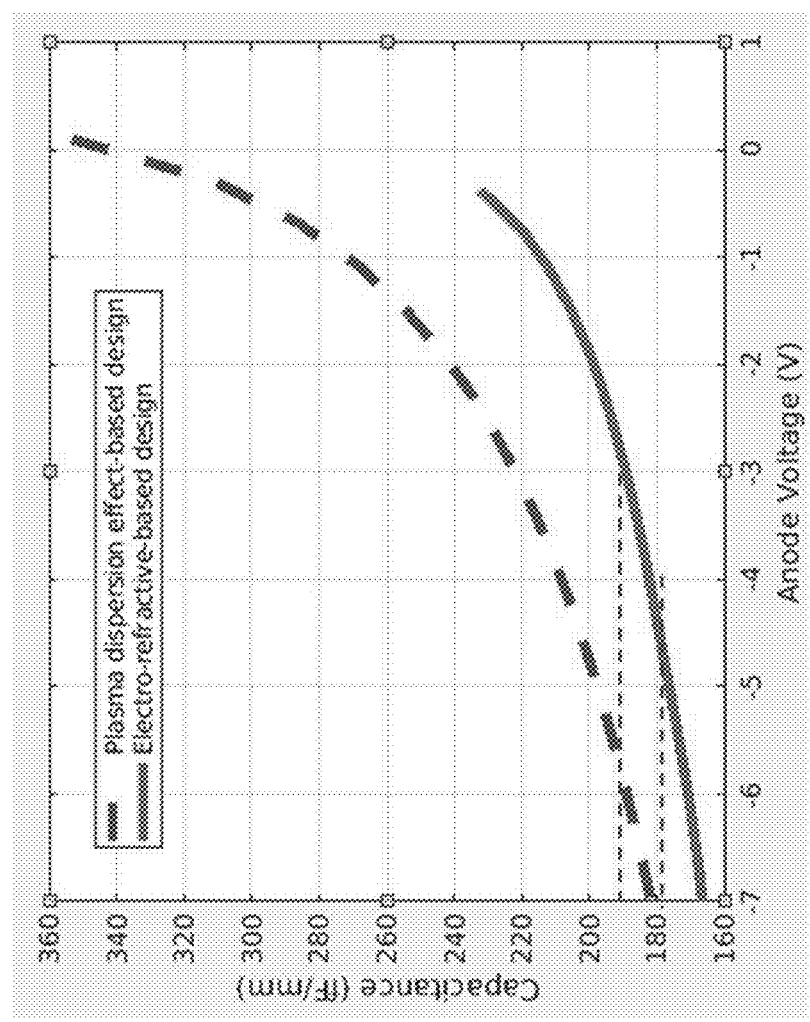
FIG. 19 is a graph of capacitance versus bias voltage for the $Si_xGe_{1-x}$ modulator of FIG. 1 utilizing the electro-refractive effect and for a SiPho-based EO modulator utilizing the plasma dispersion effect.

Furthermore, the capacitance per unit length for $Si_xGe_{1-x}$ based modulator 100 decreases compared to the SiPho-based modulator. FIG. 19 shows a graph of capacitance versus bias voltage for the $Si_xGe_{1-x}$ based modulator 100 comprising a PIN active region and the SiPho-based modulator comprising a PN junction. FIG. 19 shows a comparison between the capacitances of the $Si_xGe_{1-x}$ based modulator 100 and the SiPho-based modulator. Since the $Si_xGe_{1-x}$ based modulator 100 operates at 3V to 4V bias voltage (as described above with reference to FIGS. 25-30), the capacitance of the $Si_xGe_{1-x}$ based modulator 100 in the 3V to 4V bias voltage range needs to be compared to the capacitance of the conventional SiPho-based modulator comprising a PN junction operating at 6.5V. As seen in FIG. 19, the capacitance values for the two modulators are very similar.

Since the intrinsic region in $Si_xGe_{1-x}$ modulator 100 reduces the resistance per unit length of the Si—Ge-based modulator 100 compared to the SiPho-based modulator comprising a PN junction without the intrinsic region, and since the capacitance values for the two modulators are similar in the respective operating voltage ranges, the result is that the product of R and C, which plays an important role in the high frequency performance, is lower for $Si_xGe_{1-x}$ modulator 100 than the SiPho-based modulator. Therefore, the Si—Ge-based modulator 100 exhibits superior high frequency performance than the SiPho-based modulator.

Further, the Si—Ge-based modulator 100 of the present disclosure is compatible with CMOS fabrication process. Depending on the waveguide dimensions, an x value ranging from 4% to 10% could be selected for $Si_xGe_{1-x}$ to achieve a two-fold improvement in the $V_\pi L$ figure-of-merit. The Si—Ge-based modulator 100 provides better or comparable performance in terms of insertion loss compared to Si-based PN modulators such as the SiPho-based modulator. The Si—Ge-based modulator 100 also provides better high-speed performance, yielding higher EO bandwidth than the SiPho-based modulator.

Figure 20:
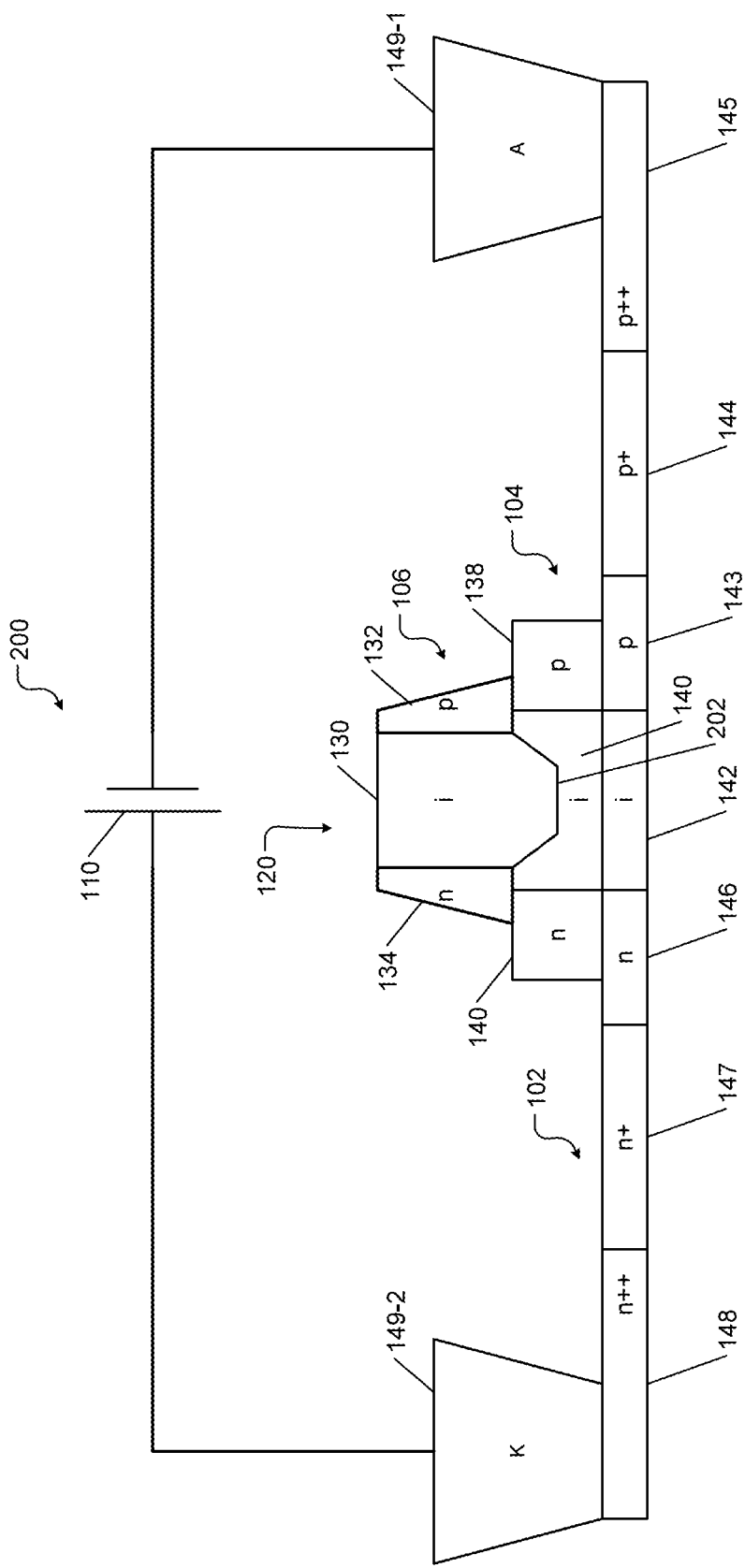
FIG. 20 shows a cross-sectional view of another example of a Si—Ge modulator according to the present disclosure.

FIG. 20 shows another non-limiting example of a Si—Ge modulator 200 according to the present disclosure. The Si—Ge modulator 200 differs from the Si—Ge modulator 100 shown in FIGS. 1-3 in that the intrinsic portion 130 of the Si—Ge layer 106 is embedded or buried in the intrinsic portion of the silicon layer 104. For example, the bottom portion of the intrinsic portion 130 of the Si—Ge layer 106 is tapered inwards and is disposed in a corresponding well or trench 202 etched in the silicon layer 104. Extending the intrinsic portion of the Si—Ge layer 106 into the intrinsic portion of the silicon layer 104 improves the coupling of the electric field via a shorter distance or path through the silicon layer 104 to the Si—Ge layer 106, which further enhances the efficiency of the Si—Ge modulator 200.

Figure 21:
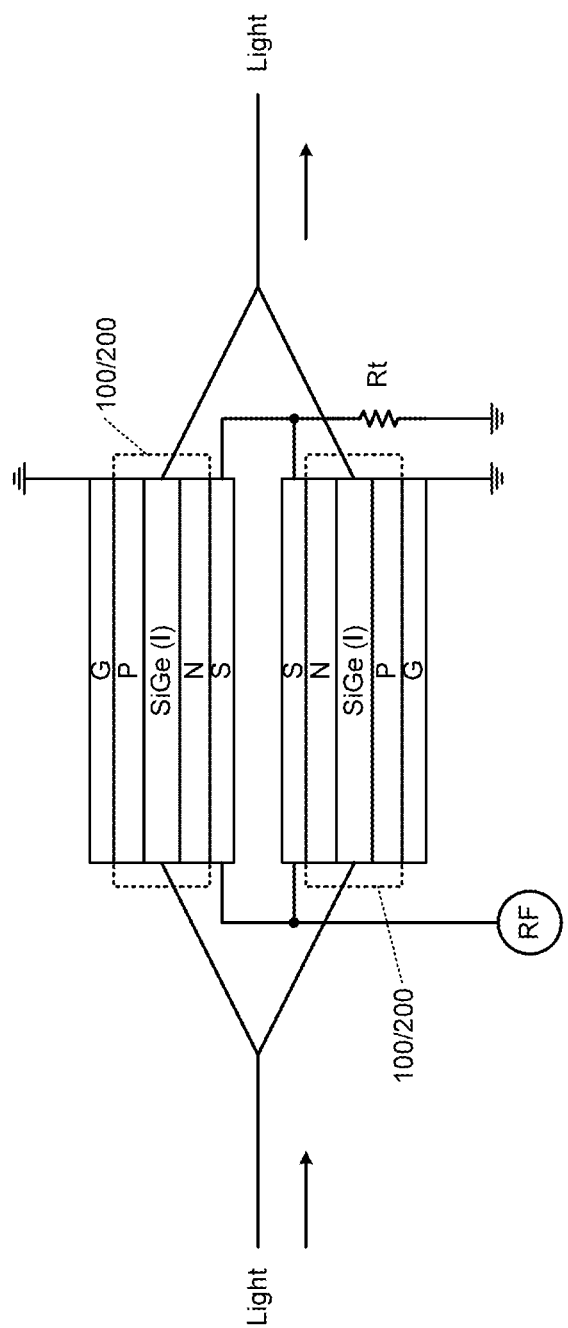
FIG. 21 shows an example of a Mach-Zehnder modulator (MZM) comprising SiGe-based modulators of the present disclosure.

The Si—Ge modulators 100, 200 described above can be implemented as Mach-Zehnder (MZ) modulators (MZMs). For example, MZMs can be single drive or dual drive. In a single drive MZM, an RF signal comprising data to be modulated is input to a single arm of the MZM. In a dual drive MZM, the RF signal is input to both arms of the MZM. FIG. 21 shows an example of a dual drive MZM comprising the Si—Ge-based modulators 100 0r 200 disposed in each arm of the MZM with traveling wave electrodes is shown.

In the MZM modulators used in transmitters in optical communication systems, an RF signal comprising digital data to be modulated using an optical carrier wave (i.e., a light wave) is applied across signal and ground electrodes (e.g., to the traveling wave electrodes shown as S for signal and G for ground) at an input of the MZM modulator. The DC bias used to reverse bias the active region of the modulators in each arm of the MZM is also supplied to the electrodes with decoupling circuits (not shown) connected to the DC bias supply to decouple the RF signal from the DC bias. The RF signal is generally a high-frequency signal comprising digital data at a high data rate (e.g., several GHz). The digital data is modulated by the MZM modulator using the light wave. An unmodulated light wave is coupled to the input of the MZM modulator. The light wave is a carrier wave for the RF signal. The light wave is split between the two arms of the MZM modulator and is applied to the Si-Pho and Si—Ge-based modulators.

Optical modulators have an optical index defined by the geometries of the waveguides of the modulators. The optical index is defined as an amount by which instantaneous power of the light carrier wave varies relative to an average power of the light carrier wave. The geometries of the electrodes define a microwave index for the MZM modulators. The microwave index is defined as a product of speed of light and square root of inductance and capacitance of the modulator.

In the MZM modulators, the Si—Ge-based modulators (100 or 200) modulate the light wave. The electric field of the RF signal changes the optical index of the modulators, which in turn creates a phase-shift between the light waves propagating through the modulators in the two arms of the interferometer. When the phase-shifted light waves from the two arms are recombined, the phase difference between the two light waves are converted to an amplitude modulated light wave due to the interference effect of the interferometer. The RF signal and the modulated light wave are combined at the output of the MZM modulator.

The traveling wave electrodes comprise metal layers deposited over the Si—Ge-based modulators. The traveling wave electrodes form a transmission line that receives the RF signal at an input end and that is terminated by a termination resistor (Rt) at an output end for impedance matching (i.e., to prevent reflections or standing waves in the transmission line).

The speed of a MZM modulator driven by a traveling wave electrode is determined by three factors: velocity matching between the microwave (i.e., the RF signal) and the optical carrier (i.e., the light wave), impedance matching of the transmission line, and microwave attenuation over the length of the modulator. The velocity matching is achieved by matching the optical index and the microwave index. The impedance matching is achieved by the termination resistor and transmission line design (e.g., width and spacing of signal and ground electrodes). The Si—Ge-based modulators 100/200 with the PIN junction reduce the resistance per unit length of the Si—Ge-based modulator 100/200 compared to the SiPho-based modulator comprising a PN junction without the intrinsic region. Therefore, the Si—Ge-based modulators (100 or 200) implemented with traveling wave electrodes exhibit lower distributed capacitance and resistance and consequently higher bandwidth than the SiPho-based modulators implemented with traveling wave electrodes.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. An optical modulator comprising:
a slab of silicon comprising a first intrinsic portion and a doped portion disposed on either side of the first intrinsic portion;
a first layer of silicon disposed on the slab, wherein the first layer of silicon comprises a second intrinsic portion and a doped portion disposed on either side of the second intrinsic portion, the second intrinsic portion at least partially overlaying the first intrinsic portion, the doped portions on either side of the second intrinsic portion at least partially overlaying the first intrinsic portion and the doped portions disposed on either side of the first intrinsic portion, respectively; and
a second layer comprising a mixture of germanium and silicon, the second layer at least partially disposed on the first layer, the second layer comprising an intrinsic portion of the mixture and further comprising first and second doped portions disposed on opposite sides of the intrinsic portion of the second layer, the intrinsic portion of the second layer and the first and second doped portions forming an active region of the optical modulator, the intrinsic portion of the second layer at least partially overlaying the second intrinsic portion of the first layer, the first and second doped portions of the second layer at least partially overlaying the second intrinsic portion of the first layer and the doped portions on either side of the second intrinsic portion of the first layer, respectively;
wherein the second intrinsic portion of the first layer comprises a well; and
wherein only the intrinsic portion of the second layer extends into the well.

2. The optical modulator of claim 1 wherein:
the active region is configured to absorb light of first and second wavelengths at first and second absorption levels, respectively, the first wavelengths being less than the second wavelengths, the first absorption level being greater than the second absorption level; and
the intrinsic portion is configured to change a refractive index of the active region to cause a 180-degree phase shift in light at the second wavelengths.

3. The optical modulator of claim 1 wherein the mixture comprises germanium and silicon in a proportion (1−x) to x, where x is a real number greater than 0 and less than 0.1.

4. The optical modulator of claim 3 wherein:
the active region is configured to absorb light of first and second wavelengths at first and second absorption levels, respectively, the first wavelengths being less than the second wavelengths, the first absorption level being greater than the second absorption level; and
the intrinsic portion is configured to change a refractive index of the active region at the second wavelengths proportionally to an amount of silicon in the mixture.

5. The optical modulator of claim 3 wherein:
the active region is configured to absorb light of first and second wavelengths at first and second absorption levels, respectively, the first wavelengths being less than the second wavelengths, the first absorption level being greater than the second absorption level;
an amount of strain between germanium and silicon in the mixture is proportional to an amount of silicon in the mixture; and
the intrinsic portion is configured to change a refractive index of the active region at the second wavelengths proportionally to the amount of strain between germanium and silicon in the mixture.

6. The optical modulator of claim 1 wherein the first layer comprises a well and wherein the intrinsic portion of the second layer extends into the well.

7. The optical modulator of claim 6 wherein the well is configured to enhance an amount of electric field coupled to the active region of the optical modulator in response to a bias applied to the optical modulator.

8. The optical modulator of claim 1 wherein:
the doped portions disposed on either side of the first intrinsic portion of the slab of silicon are doped with dopants of first and second types, respectively;
the doped portions on either side of the second intrinsic portion of the first layer are doped with the dopants of the first and second types, respectively; and
the first and second doped portions of the second layer are doped with the dopants of the first and second types, respectively.

9. The optical modulator of claim 1 wherein the well is configured to enhance an amount of electric field coupled to the active region of the optical modulator in response to a bias applied to the optical modulator.

10. The optical modulator of claim 1 further comprising:
first and second electrodes coupled to first and second ends of the slab, respectively, with the first electrode being grounded and the second electrode being connected to ground via a termination resistor; and
a DC bias coupled to the first and second electrodes to reverse bias the active region of the optical modulator.

11. The optical modulator of claim 10 wherein the first electrode is configured to receive an RF signal comprising data to be modulated by the optical modulator with an optical carrier wave coupled to the active region through the first layer.

12. The optical modulator of claim 10 wherein the first and second electrodes comprise traveling wave electrodes disposed proximate to the active region of the optical modulator.

13. The optical modulator of claim 1 further comprising a plurality of doped portions disposed on either side of the doped portion disposed on either side of the first intrinsic portion wherein at least one of widths and doping levels of the plurality of doped portions increase as the distances between the plurality of doped portions from the first intrinsic portion increase.

* * * * *